United States Patent [19]
Pearl

[11] 3,805,650
[45] Apr. 23, 1974

[54] APPARATUS AND METHOD FOR CUTTING SHEET MATERIAL

[75] Inventor: David R. Pearl, West Hartford, Conn.

[73] Assignee: Gerber Garment Technology, Inc., East Hartford, Conn.

[22] Filed: Mar. 26, 1973

[21] Appl. No.: 345,305

[52] U.S. Cl............................ 83/56, 83/71, 83/522, 83/925 CC
[51] Int. Cl. ...................... B26d 1/10, A41h 43/00
[58] Field of Search...... 83/13, 56, 71, 522, 925 CC

[56] References Cited
UNITED STATES PATENTS
3,477,322  11/1969  Gerber et al............................ 83/71

Primary Examiner—J. M. Meister
Attorney, Agent, or Firm—McCormick, Paulding & Huber

[57] ABSTRACT

An apparatus and method for cutting sheet material is provided which includes a numerically controlled cutting machine which cuts a spread of sheet material positioned on a supporting surface of penetrable material. Each individual pattern piece desired to be cut is converted to a numerical program form for controlling the cutting machine, and is stored for ready retrieval, for example in a computer memory. Indexing marks are provided on the spread to be cut, the cutter is positioned relative to such marks, the desired program pattern is selected and the cutter is controlled by the selected program to cut the desired pattern. The process is repeated until all desired pattern pieces are cut, thereby providing great flexibility in pattern selection and placement on a spread or plurality of spreads of materials.

9 Claims, 5 Drawing Figures

PATENTED APR 23 1974    3,805,650

APPARATUS AND METHOD FOR CUTTING SHEET MATERIAL

BACKGROUND OF THE INVENTION

This invention relates to the cutting of sheet material, and more particularly to an improved system and related method for operating automatic cutting machinery which allow an operator greater flexibility in cutting an almost limitless number of different patterns on variously placed spreads of material. The improved system and method effectively deal with the problems of programming, pattern matching and registration, the avoiding of defects, and the elimination of displaced pattern spreads.

Numerically controlled cutting machines have been developed for the automatic cutting of full-sized markers. The marker or layout is prepared in a manual or automatic manner, converted to numerical form on a large area digitizer whose digital output is placed on punched cards or other memory device, and the cards are processed in a computer to convert the digitized card information to a program which operates the automatic cutting machine to cut the pieces defined by the entire marker from a large spread.

With small markers or only a few patterns, this programming approach can be cumbersome, expensive, time consuming, and can restrict the use of the automatic cutting machine. For example, in the garment industry, variations in ordered sizes of a specific article require continuously different marker arrays of the same group of pattern pieces. Accordingly, an entirely separate program may be provided for each different marker array. Again, for certain garment applications, such as knitted sportswear, small spreads may be laid up from which only a single garment piece, like a sweater back, is cut. Such small spreads in random array on a cutting table do not lend themselves to present programming techniques. Problems also exist with the positioning of pattern pieces or the cutting of pieces to match specific designs and patterns. Another problem which would be difficult to deal with using present programming methods is to avoid cutting in areas of the fabric which have defects, or to follow a displaced design where figures or patterns on the fabric are distorted or displaced.

Accordingly, it is an object of this invention to provide an improved method and apparatus for cutting sheet material which allow the operator great flexibility in the use of automatic cutting machinery.

Another object of this invention is to provide an improved programming technique for position placement of individual patterns. The programming is greatly simplified for different combinations of the same group of patterns which are variously arrayed in single or multi-piece markers.

A further object of this invention is to provide an improved method and apparatus suitable for cutting semi-automatically large spreads or layups, or a plurality of groupings of smaller layups without sacrificing the speed and precision of automatic machine cutting.

SUMMARY OF THE INVENTION

In carrying out this invention in one illustrative embodiment thereof, programs for controlling a cutting machine are provided in the form of a subprogram for each individual pattern piece which is desired to be cut from a spread of sheet material. The subprograms are retrievably stored so that they may be located for use. The positioning of individual pattern pieces on the spread of sheet material from which the pieces are to be cut is established by placing index marks for each piece on the spread. The cutting machine is then moved and the cutter blade aligned relative to the index mark of an individual pattern piece before it is cut. The subprogram corresponding to the individual pattern piece selected is retrieved and utilized to control the cutting machine to cut the outline of the individual pattern piece selected. The operator follows this procedure until all pattern pieces are cut, whether it be from an individual or a group of spreads.

DESCRIPTION OF THE PREFERRED EMBODIMENT

In the following description, an illustrative embodiment of the present invention is described in connection with the use of apparatus shown and described in U.S. Pat. No. 3,495,492 entitled "Apparatus for Working on Sheet Material" and U.S. Pat. No. 3,548,697 entitled "Apparatus for Cutting Sheet Material", which are assigned to the assignee of the present invention. It will be appreciated that the invention is not limited solely to the use of such apparatus.

Figure 1:
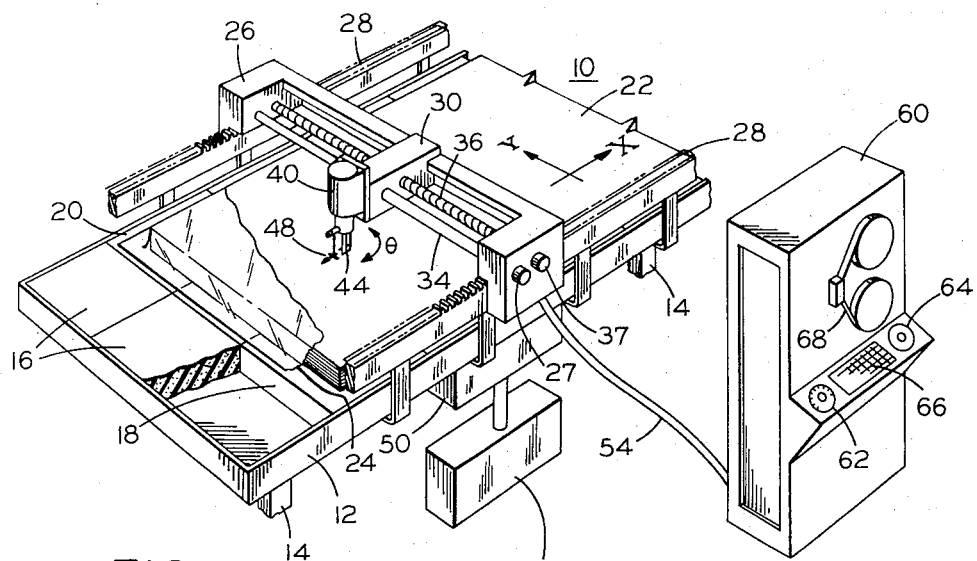
FIG. 1 is a fragmentary perspective view of one form of sheet material cutting apparatus which may be utilized in the present invention.

Referring now to FIG. 1, a sheet material or fabric cutting apparatus, which is referred to generally with the reference character 10, is shown having a table 12 supported on legs 14 therefor. The table 12 is in the form of a container-like frame which carries a plurality of blocks of penetrable plastic material 16, such as foamed polyethylene, or bristle arranged to form a bed 18 having a flat upper surface 20 thereon. The substantially continuous planar surface 20 formed by the upper surfaces of the blocks 16 supports a layup or spread 22 of a single or plurality of sheet materials, such as fabric, which are arranged in vertically stacked relation and in position on the surface 20 to be cut. The layup of sheet material 22 is covered by a sheet of thin plastic film 24, e.g. polyethylene which serves to contain a vacuum which is applied to the layup 22.

A main carriage 26, which transversely spans the table 12, is supported on the table by a pair of elongated racks 28 mounted on opposite sides of the table 12 and extending longitudinally thereof for moving the carriage 26 in a longitudinal or X direction. The main carriage 26 includes a drive shaft (not shown) which also extends transversely of the table and has pinions mounted at opposite ends for engagement with the racks 28 to move the carriage 26 longitudinally of the table in response to operation of a drive motor 27 drivingly connected to the shaft. The main carriage 26, movably carries thereon a cutter carriage 30 mounted for movement in the Y direction on a guide bar or tube 34 and a lead screw 36, which also extends transversely of the table 12 and serves to support and drive the cutter carriage 30 transversely of the table, or in the Y direction, in response to the operation of another drive motor 37 drivingly connected with the lead screw 36.

The cutter carriage 30 has a cutter head 40 mounted thereon for vertical movement relative thereto so as to be capable of being raised and lowered to elevate a reciprocating cutting blade 42 and an associated presser plate 44 mounted thereon from a normal cutting position to a position at which they are located entirely out of contact with and above the fabric layup 22. Thus, when the cutter head 40 is raised, the lower extremity of the blade 42 is positioned above the layup 22 so that the head with the blade may, if desired, be moved to any preselected position above the layup, and then lowered to pierce the layup, thus allowing a cut to be started on any desired position in the fabric.

The blade 42 is reciprocated vertically by a motor (not shown) in the cutter head 40, and is also rotated about its own vertical axis, referred to as the θ (theta) axis, as indicated in FIG. 1, by another motor (not shown) in the cutter head 40.

Figure 2:
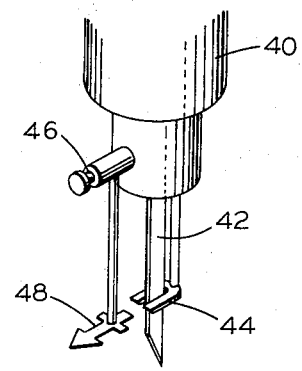
FIG. 2 is a fragmentary perspective view of a pointer shown in FIG. 1.

The cutter head 40 also carries a locater or pointer 48 shown in detail in FIG. 2. The pointer is pivotally mounted on a pin 46 projecting from the head so that the pointer may be pivoted into the illustrated operative position in front of the cutter blade 42 for precisely positioning the cutter head 40 and blade 42 relative to a desired location or index mark on the layup 22, and is then swung upward and out of the way to a stowage position after the positioning of the cutter head 40 is performed. Forms of pointers other than that shown in FIG. 2 may be utilized to perform the function of accurately positioning the cutter blade 42 over a specific point on the layup 22. For example, an optical system utilizing a light source, lens, and reticle could be mounted in the cutter head to project an image of the reticle, for example in the form of a cross-hair, on the layup for accurately positioning the blade 42 of the cutter head 40. The importance of accurately locating the reciprocating blade 42 will be discussed hereafter.

The table 12 is provided with ducts 50 which are connected to a vacuum pump 52. The plastic overlay or film 24 on the spread or layup 22 serves to contain the vacuum applied through the table surface or bed 18 of porous or vertically vented plastic blocks 16, causing the sheet material or fabric in the layup 22 to be compressed into a firm stack that will not shift during cutting. The drawing, for ease of illustration, only shows one table segment and a diagrammatic showing of the vacuum system; but, it will be understood that each table segment has a separate vacuum valve which is actuated by the carriage 26 when it is over a particular segment. Vacuum is applied, therefore, only to the area under the carriage to hold the fabric being cut. This allows the cut bundles to be easily removed, and makes the application of the vacuum from a single source practical.

The cutting apparatus 10 includes a control console 60 which automatically feeds control signals through a cable 54 to the various drive means in the carriages 26 and 30 and the cutter head 40. The control console 60 includes coded information on a punched paper or magnetic memory tape 68 to define the control instructions for the cutting apparatus, an address keyboard 66 which is utilized for selecting the proper program recorded on the memory tape 68, a starter switch 64 for activating the cutting machine under control of a programmed tape 68, as well as a skew control 62 for controlling the angle of the pattern cut on the layup.

In accordance with prior art techniques, the preparation of memory tapes with coded information begins with a full-sized marker stencil or pattern prepared in a conventional manner and converted to numerical form on a large area digitizer. The digitized information is prepared on punched cards which are fed to a general purpose computer whose output is placed on the punched paper or magnetic tape 68. The cutter carriage 30 and cutting blade 42 are then positioned over an edge or corner of the spread or layup 22, and the entire marker is cut from the layup 22 under the direction of the control console 60. This approach is cumbersome and expensive in some instances, particularly in the garment industry, where small markers or single pattern pieces are to be cut. The system lacks flexibility in handling small spreads, for example on the order of one square yard, from which one or only a few garment pieces are cut, or in handling a plurality of small spreads which are located in random arrays on the cutting table.

The present invention deals with this problem and provides flexibility by allowing individual pattern piece cutting programs to be executed anywhere on the work surface of the cutting table, thereby allowing an operator great flexibility in cutting patterns wherever he wishes on variously placed spreads of fabric. In the system according to the present invention, each pattern is individually digitized and programs in the form of a subprogram for each individual pattern piece which is desired to be cut from a spread of sheet materials are provided to cause the cutting blade to enter the fabric, cut a selected pattern, withdraw from the fabric and stop for each specific subprogram. The total number of such subprograms are entered into a computer memory system, for example paper tape, magnetic tape, disc memory, core memory, or other and may be identified by some sequence or address. If the subprograms are identified by addresses in a random access memory device, they are retrievably stored so that they may be individually selected at will by the operator. Alternately, the subprograms may be retrievably recorded on a tape or other memory device in a preselected sequence without addresses and the operator of the cutting machine is then limited to cutting the corresponding pattern pieces in the same sequence as recorded.

Figure 3:
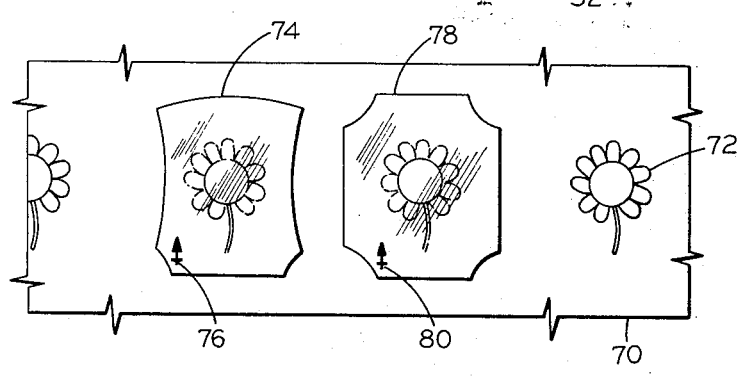
FIG. 3 is a plan view of a spread or layup of fabric with a transparent contour piece positioned over portions of the fabric design, illustrating one application of the present invention.

To illustrate one mode of operation of the present invention, reference is now made to FIG. 3, which shows a fabric 70 printed with a flower design 72 which is to be cut into different but related pieces, for example, a chair-back piece and a chair-cushion piece. Aesthetically, the flower designs in the fabric should be centrally located within the contours of the cut pieces. Therefore, it is necessary that the subprograms for the individual pieces be positionally correlated with the designs at the more-or-less arbitrarily established positions on the cutting table.

To this end the machine operator may select a plastic template 74 in the shape of the chair-back and having an index mark 76 for determining the positioning of the template, or more importantly, the pattern piece to be cut from the fabric. The plastic template is then placed on the spread with the flower design visible through the template in the centered position. In the same manner, he selects and places on the other flower design a plastic template 78 in the shape of the chair cushion having an index mark 80 thereon. The arrow-type marks on the templates correspond with the pointer 48 and completely identify the position of the templates by providing both location (translational) and orientation (rotational) of the templates and corresponding pieces. Of course, other marks could be used for the same information. The plastic templates 74 and 78 in the form of the pattern to be cut may be provided with an address or sequence number so that the subprogram in the memory tape may be readily identified.

In operation, the operator moves the cutter carriage 30 and the blade 42 and accurately positions the locating pointer 48 over the index mark 76. It should be noted that the index mark 76 is positionally related to the contours to be cut in a known manner accounted for by the subprogram on the tape 68. The mark may be on the contour or displaced therefrom, as long as the subprogram handles the displacing of the blade to a starting point on the pattern contour so that the pattern is cut in the position shown. Once the locating pointer 48 is positioned over the index mark, the locating pointer 48 is swung out of the way, the template 74 is removed from the spread, and the address keyboard 66 is punched with the identification number of template 74, which sets the control in condition to cut pattern piece with the flower design in the contoured position. The starter switch 64 of the console 60 is actuated to thrust the blade into the layup 22 to cut out the pattern piece and lift the blade after it has been cut. The system is then set to move onto the next template 78. The operator again positions the pointer 48 over the index mark 80, addresses the control console using keyboard 66 to identify the pattern desired to be cut, thus loading the control console with the program for cutting pattern piece, and removes the template 78. The starter switch 64 is actuated to cut the pattern, and the process is continued for cutting as many individual patterns as desired. Of course, removal of the template before the machine is actuated is not always necessary, especially if it is an expendible item such as a tissue paper pattern.

The control console 60 is provided with a skew control 62 so that the pattern may be cut at any desired angle relative to the X and Y coordinate axes of the table. Once a template is positioned on a design, the locating pointer 48 is used to determine the orientation of the index mark and the template by either comparing the orientations of the pointer and mark or by actually rotating the pointer on the head 40 into alignment with the mark and measuring the rotation of the head. The skew control, in effect, rotates the coordinates along which the cutting apparatus operates. To obtain an angled cut, all that is then necessary is to set the skew control to the selected angle. Alternatively, the skew control may be coupled directly to a sensor which measures the rotation of the head 40 and automatically effects coordinate rotation.

The flexibility offered by the system of this invention allows selected positioning of the patterns to be cut. The operator simply locates and orients the pattern to be cut with the various designs that may appear on the fabric. For example, if flaws appear in the design, the operator merely moves the template to avoid such flaws. Also, wherever the flower designs are placed, the operator may center the pattern over the design which would not have been possible with a fully programmed marker referenced to the edges of the cutting table.

Figure 4:
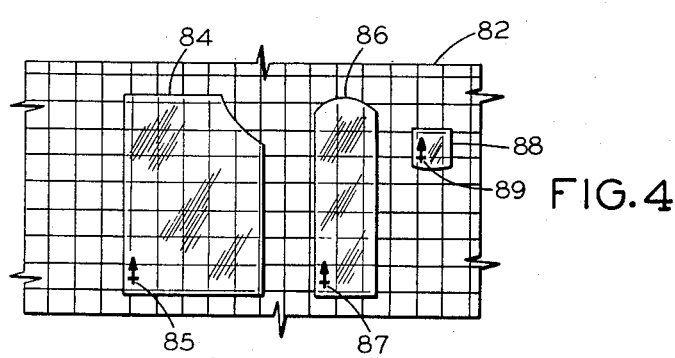
FIG. 4 is a plan view of a layup of fabric having a plaid design on which patterns are placed for matching different portions of the plaid design in different pattern pieces which are to be cut from the layup.

FIG. 4 illustrates the use of the present system to provide proper registration on a plaid fabric 82 of a jacket front pattern by means of a corresponding template 84 with an index mark 85 thereon, a sleeve template 86 having an index mark 87 thereon, and a pocket template 88 having index mark 89 thereon. By positioning the templates 84, 86 and 88, the operator can precisely register the various plaid patterns of the pocket and the sleeve with the front so that corresponding stripes or colors may line up or be repeated in the finished product. This would be difficult, if not impossible, to do with a complete marker containing these pieces already programmed on the tape, since aligning the various parts relative to the designs in one or more spreads is hard to control especially if the design is distorted or displaced in the fabric.

FIG. 4 also illustrates another aspect of the invention, in which the patterns illustrated by the templates 84, 86 and 88 may be put on tape 68 in numerical sequence to agree with the numerical cutting sequence desired on the spread of fabric. The operator still has freedom to move the pattern position on a spread to avoid defects, to match patterns, or to follow a displaced design, but he does not search the memory, except for the beginning of the sequence, for each pattern piece as long as he calls them out in sequence. To illustrate such an operation, the operator positions the pointer 48 over the index mark 85, sets the control console through keyboard 66 for the sequence of subprograms having patterns corresponding to templates 84, 86 and 88 recorded thereon in sequence, and presses the starter switch cut the front pattern 84. After the front is cut from the plaid fabric 82, the operator then moves onto the sleeve (template 86), indexes the carriage to index mark 87, and this time merely presses the starter switch, since the program is in sequence and the subprogram for the sleeve follows the subprogram of the front. The same procedure would follow for cutting the pocket (template 88).

Figure 5:
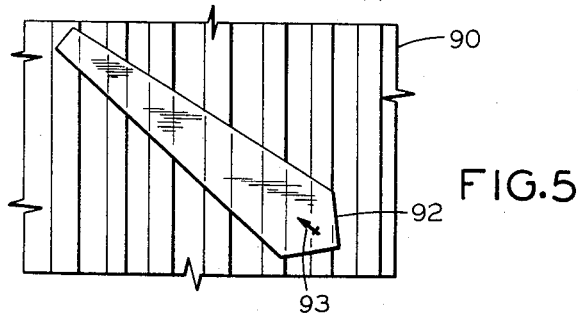
FIG. 5 is a plan view of a layup of fabric having a striped design, illustrating still another application of the present invention.

FIG. 5 further demonstrates the flexibility of the present system when applied to cutting a striped fabric 90. Again, a pattern cutout or template 92 of plastic in the shape of a tie is placed by the operator on the diagonal of the striped fabric 90, and the index mark 93 is registered with pointer 48 on the cutter head 40 of the cutting machine. The subprogram for the pattern 92 is retrieved and read by the cutter console for cutting out the pattern by actuating starter switch 64. Using the same template 92 again, the operator then needs only turn the skew control 62 to provide a plurality of ties with different diagonal designs. This procedure could be carried on for different angles from 0° to 180°. In each case, the operator would locate the pointer 48 over the index mark 93, and align it therewith, set the skew control and actuate the control console to cut the pattern.

It will be apparent that control of the console 60 may be remotely carried out by having a remotely connected keyboard, carriage activator, and skew control positioned on or near the carriage, and further that a remote computer could be used having a random access memory for loading the proper subprogram into the control console 60. The described system can be used with a preprinted marker (array of pattern pieces) spread on the fabric, or with a marker constructed piece by piece by tracing around individual pattern templates on the fabric. In either case, the location and orientation of the index mark of each pattern piece is necessary so that the operator can individually and accurately identify the position of each pattern piece to be cut with the cutter blade on the cutter head.

Summarizing the Applicant's system, a program for controlling a cutting machine is provided which is made up of subprograms, one for each individual pattern piece which is desired to be cut. Such subprograms are entered into a memory system and each subprogram is identified by its sequence or address. The cutting machine operator positions the cutting head accurately relative to an index mark indicated on a spread of fabric, for example by a plastic pattern or template having the index mark thereon, or by a mark previously placed directly on the fabric. The index mark shows the location (translational) and/or orientation (rotational) of the pattern. The operator, either by knowing the call number of the desired pattern piece or by following a previously established pattern cutting sequence, retrieves the pattern to be cut from the memory by any standard means, such as dial controls, push buttons, typewriter instructions, penlight, or others. The operator also actuates the control to cut the retrieved pattern, and after the pattern is cut, the cutting system is available to be moved onto the next pattern position. As has been pointed out above, this provides great flexibility for an expensive piece of machinery, and enhances its application to larger varieties of cutting. For small as well as large jobs, this system totally simplifies the complex programming techniques previously employed. The system offers the skill, speed and precision of the automatic cutting machine, while the operator is given greater control over the immediate cutting operations.

Since other modifications and changes, varied to fit particular operating requirements and environments, will be apparent to those skilled in the art, the invention is not considered limited to the examples chosen for purposes of disclosure, and covers all changes and modifications which do not constitute departures from the true spirit and scope of this invention. For example, although the pointer 48 has been connected to the cutting head 40 to accurately detect the position of the pattern on the sheet material, the cutting blade itself may be used for this purpose instead. In a more fully automated system, the pointer may include a sensor which automatically informs the control console 60 of the pattern position and identification so that the proper subprogram is automatically retrieved and cut in the correct position. It will be understood that the method and apparatus disclosed can be used to cut single or multi-ply spreads of sheet material; however, with multi-ply spreads, the spreading operation must be carefully performed to cause the designs of the stacked sheets to be coincident and such coincidence may be assured by pins or other clamps holding the sheets in precise registration. Accordingly, the method and apparatus have been described in preferred embodiments by way of illustration rather than limitation.

I claim:

1. A method for cutting pattern pieces from sheet material with an automatically controlled cutting machine comprising the steps of:
    a. retrievably storing cutting machine control programs in the form of a subprogram for each individual pattern piece which is desired to be cut from a spread of sheet material positioned on a cutting machine,
    b. placing on a spread of sheet material a template having an index mark and contours corresponding to a stored subprogram for indicating the positioning of a desired pattern piece to be cut from the spread,
    c. positioning the cutting head of the cutting machine relative to said index mark,
    d. retrieving the subprogram for the desired pattern piece to be cut by the cutting machine, and
    e. actuating the cutting machine for cutting the desired pattern piece from a spread on the machine in response to the retrieved subprogram.

2. The method set forth in claim 1 further defined by drawing a vacuum in the area of said spread of sheet material being cut on the cutting machine while a cut is made therefrom.

3. The method set forth in claim 1 wherein the index mark identifies both location and orientation of the pattern piece and the step of placing comprises placing the index mark on the spread in accordance with a desired location and orientation of the pattern piece.

4. The method set forth in claim 1 wherein the step of retrievably storing comprises storing in a memory tape a series of subprograms in a predetermined sequence corresponding to a selected cutting sequence.

5. The method set forth in claim 1 including the additional step of removing the template from the spread of sheet material before the step of actuating.

6. In a system for cutting sheet material which employs a cutting machine having a penetrable supporting surface on which a spread of sheet material is positioned for cutting pattern pieces thereon, a carriage having a cutter positioned thereon for moving said cutter in one of two coordinate directions in the plane of said penetrable surface and through said spread of sheet material, said carriage and cutter having numerically controlled drive means which are controlled by coded information supplied from programs, the improvement comprising:
    a. means for retrievably storing programs in the form of a subprogram for each individual pattern piece which is desired to be cut from a spread of sheet material,
    b. means for identifying an index mark relative to a pattern piece outline and in association with said spread of sheet material from which the pattern piece is to be cut,
    c. means for positioning said cutter with respect to the index mark of an individual pattern piece which is desired to be cut from a spread of sheet material on said penetrable surface, d. means for retrieving a stored subprogram corresponding to an individual pattern piece to be cut, and e. means for actuating said cutting machine under the control of a retrieved subprogram thereby cutting the outline of said individual pattern piece.

7. In a system for cutting sheet material, the improvement as set forth in claim 6 wherein the index mark of the identifying means is fixed in location and orientation relative to the outline of an individual pattern piece to be cut.

8. In a system for cutting sheet material, the improvement as set forth in claim 7 wherein the identifying means comprises a template having the same outline as a pattern piece to be cut and bearing the index mark.

9. In a system for cutting sheet material, the improvement of claim 6 wherein the means for positioning includes a locating pointer connected with the cutter and carriage for movement with the cutter.

* * * * *